United States Patent [19]

Weimer

[11] 3,728,555

[45] Apr. 17, 1973

[54] SIGNAL TRANSFER SYSTEM FOR PANEL IMAGE SENSOR

[75] Inventor: Paul Kessler Weimer, Princeton, N.J.

[73] Assignee: RCA Corporation, Princeton, N.J.

[22] Filed: Mar. 29, 1972

[21] Appl. No.: 239,080

Related U.S. Application Data

[62] Division of Ser. No. 72,944, Sept. 17, 1970.

[52] U.S. Cl. ....................307/246, 307/242, 307/254
[51] Int. Cl. ..............................................H03k 17/00
[58] Field of Search......................307/246, 242, 243, 307/254; 328/104

[56] References Cited

UNITED STATES PATENTS 3,553,479 1/1971 Nelson.............................307/246 X

*Primary Examiner*—John Zazworsky
*Assistant Examiner*—B. P. Davis
*Attorney*—Eugene Whitacre et al.

[57] ABSTRACT

The image information producing photosensitive elements of the sensor, which are arranged in rows and columns, are addressed row-by-row and column group-by-column group to decode the information. The signal information from a group of elements in a row is impressed simultaneously upon a like group of signal processing circuits, with each of which is associated a pair of signal storage devices, each having an input gate and an output gate. The input gates for one set of corresponding storage devices are concurrently operated to impress a group of signals simultaneously upon these storage devices during a given time period while the output gates for the other set of corresponding storage devices are operated sequentially to transfer the signals stored in the other set of storage devices to the output circuit. The operation of the input and output gates is reversed in the succeeding time period and this alternating operation continues until the information from all of the sensor elements is transferred to the output circuit.

The invention herein was made in the course of or under contract or subcontract thereunder with the Department of the Air Force.

8 Claims, 4 Drawing Figures

SIGNAL TRANSFER SYSTEM FOR PANEL IMAGE SENSOR

This is a division of application Ser. No. 72,944 filed Sept. 17, 1970.

BACKGROUND OF THE INVENTION

In panel type arrays of a multiplicity of discrete photosensitive elements arranged in rows and columns and constituting image pickup apparatus, it has been customary to derive video signals from such an array by effectively addressing (scanning) the individual elements sequentially in row after row. In order that the derived video signals have bandwidths which are sufficiently wide to be representative of the full light information content of the elements of the array it is essential that the decoder and output coupling circuits used in such a scanning system have frequency responses which are well in excess of the rate at which the scanning is done. The fabrication of such an array and its integrated decoding components would be easier if the array and its decoder were not required to meet such high frequency standards.

An object of this invention, therefore, is to provide a novel signal transfer system of which the integrated decoding components and associated circuitry have a relatively low frequency response and which is effective to convey full information video signals from an array of photosensitive elements to an output circuit.

SUMMARY OF THE INVENTION

The signal transfer system of the invention comprises (1) decoding apparatus connected to the columns of the photosensitive array for deriving simultaneous signals from a group of the elements in a selected row during a relatively long first time period; (2) multiplexing apparatus for transforming the simultaneous signals into sequential signals and applying them to an output circuit during a subsequent time period equal in duration to the first time period; and (3) coupling apparatus for transferring the signals derived by the decoding apparatus to the multiplexing apparatus. In such a system only the multiplexing apparatus need have a relatively high frequency response.

The decoding apparatus includes a plurality of signal conveying conductors equal in number to a submultiple of the total number of photosensitive element columns in the array, and means operable to sequentially connect selected groups of columns of the array to these conductors, the number of columns in each group being equal to the number of conductors. The coupling apparatus includes a pair of odd and even column group signal storage devices provided with input gates coupled to each of the signal conveying conductors. These gates are operatively controlled so that the plurality of signals from the conductors are simultaneously transferred to, and stored in, respective sets of corresponding ones of the storage devices during alternating time periods. The multiplexing apparatus includes output gates coupled respectively between the storage devices and the output circuit and operatively controlled so that the signals stored in one set of corresponding storage devices are transferred sequentially to the output circuit during the time period that another plurality of signals is being stored in the other set of corresponding storage devices.

A feature of the invention is a particular signal transfer circuit which comprises a pair of signal storage devices (e.g., capacitors) respectively coupled to sources of two sets of signals by normally non-conducting unidirectional conducting devices (e.g., diodes). The unidirectional conducting devices are rendered alternately conducting during respective relatively long time periods to store signals from their respective sources. The signal storage devices also are coupled to a single output circuit by respective normally non-conducting signal transfer devices (e.g., transistors) which are respectively prepared for conduction during alternate ones of the relatively long time periods. The prepared ones of the transfer devices is rendered conducting for a fractional portion of the long time periods to transfer the signal stored in its associated storage device to the output circuit.

For a more specific disclosure of the invention reference may be had to the following detailed description of a number of illustrative embodiments thereof which is given in conjunction with the accompanying drawings, of which:

DESCRIPTION OF THE INVENTION

Figure 1:
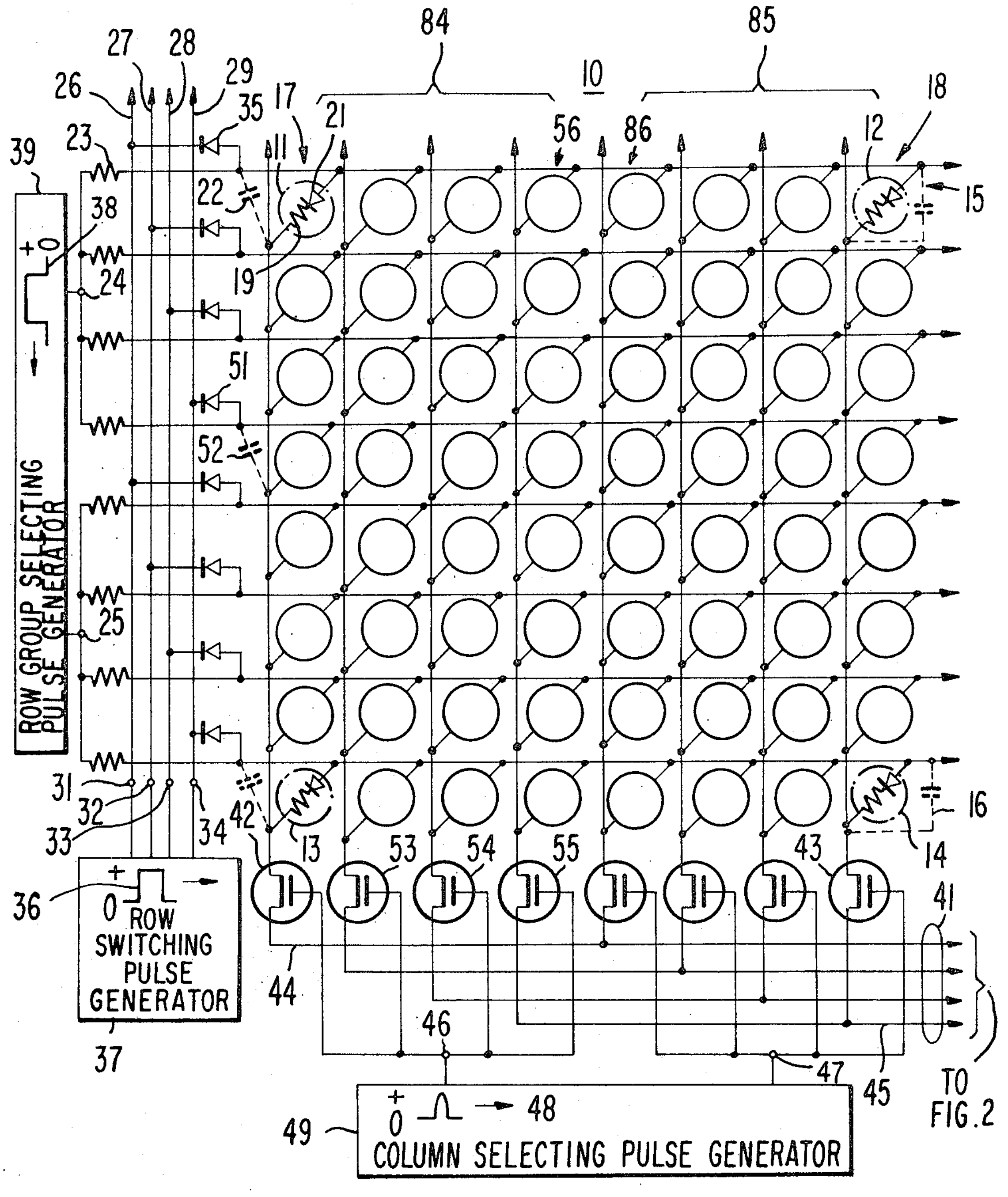
FIG. 1 is a schematic diagram of a portion of a panel type image sensor and of a part of the signal transfer system of the invention.

In the image sensor array 10 of FIG. 1, the photosensitive panel elements 11, 12, 13 and 14 are arranged in rows and columns. For example, the elements 11–12 and 13–14 respectively are in rows identified by the reference numerals 15 and 16 with other indicated elements, and the elements 11–13 and 12–14 respectively are in columns identified by the reference numerals 17 and 18 with other indicated elements. Each of the photosensitive elements effectively comprises a photoconductor and a diode. These components are represented, for example, in the element 11 by a resistor 19 connected in series with a diode 21. It is to be understood that, when suitable connections are made to the panel elements, such as the element 11, current will flow through the resistive photoconductor 19 and the diode 21 in a magnitude determined by the amount of light striking this element of the panel.

In such an image sensor panel, the row and column conductors are in the form of metallic strips which overlie one another at their intersections with a layer of intervening insulation. Each intersection, therefore, represents a small amount of capacitance, the total of which in any column of elements, may be used as a signal storage component for that column in a manner, and for a purpose, subsequently to be described. In column 17, for example, each of the elements, such as the element 11, has associated therewith an inherent capacitance 22 produced by the intersection of the conductors of row 15 and column 17. All other elements of the panel have similar inherent capacitances.

The image representative information produced by such a panel type sensor is derived therefrom by a systematic arrangement of row and column switching. The row switching apparatus, which is not part of the present invention, may take the form shown in FIG. 1 which includes diodes connected to the rows of the panel and controlled by clock pulses. For example, each of the rows of elements, such as the row 15, is connected through a resistor, such as the resistor 23, to a primary row switching terminal 24. In the illustrated array of eight rows, four rows are connected through respectively associated resistors to each of two primary row switching terminals 24 and 25. In general, for a panel of MN rows there would be M primary switching terminals and N rows connected to each terminal. There also are provided N, in this case four, row switching bus bars 26, 27, 28 and 29 connected respectively to N, in this case four, secondary row switching terminals 31, 32, 33 and 34. Each of the switching bus bars 26, 27, 28 and 29 is connected by a diode to a row conductor in each of the groups connected to a primary row switching terminal. For example, a diode 35 is connected between the bus bar 26 and the conductor of panel row 15.

A positive-going row switching pulse 36 is applied in sequence to the secondary switching terminals 26, 27, 28 and 29 by a clock controlled row switching pulse generator 37 at the row or line scanning rate. A positive-going row group selecting pulse 38, derived from a clock controlled row group selecting pulse generator 39, is applied in sequence to the primary row switching terminals 24 and 25 at 1/M times the row scanning rate. Both of the generators 37 and 39 may be multistage shift registers of the type described in U.S. Pat. No. 3,252,009 granted May 17, 1966 to P. K. Weimer.

Each elemental column of the panel 10 is connectable to one of a group of signal transfer conductors 41 by an associated normally non-conducting signal transfer device. For example, columns 17 and 18 are coupled respectively by field effect transistors 42 and 43 to conductors 44 and 45 of the conductor group 41. As in the previously described row switching apparatus, the columns in the illustrated panel 10 are connected in groups of four respectively to the four conductors of the group 41. The control gate electrodes of the signal transfer transistors are connected in groups of four to column switching terminals 46 and 47. In general, in a panel of PQ elements per row, i.e., PQ columns, there would be P column switching terminals and Q transistor gate electrodes connected to each terminal.

A positive-going pulse 48 is impressed in sequence upon the column switching terminals 46 and 47 by a clock controlled column selecting pulse generator 49 of the type described in U.S. Pat. No. 3,252,009. It should be noted that the pulse 48 is much narrower than the row switching pulse 36 because pulse 48 serves only to discharge the column capacitances once during the scanning of each portion. Also, the pulse 48 need not be a rectangular pulse with associated high frequency harmonic content because the column capacitances are discharged in groups rather than individually. This enables the use of less critical switching elements, such as transistors 42, 53, 54 and 55. The rate at which the pulse 48 is transferred from the terminal 46 to the terminal 47 is a submultiple Q of the rate at which the elemental information is to be transferred to the output circuit. In the illustrative case of FIG. 1, the submultiple Q is four which also is the number of transfer conductors in the group 41.

That part of the decoding apparatus shown in FIG. 1 operates in the following manner. When the row group selecting pulse 38 is applied to the primary switching terminal 24 and the row switching pulse 36 is applied to the secondary switching terminal 31 and to the bus bar 26, the diode 35 is rendered non-conducting, thereby applying the positive voltage of the pulse 38 to all of the photosensitive elements of row 15. All other diodes, such as the diode 51, in the group associated with the primary switching terminal 24 are conducting by virtue of the positive voltage of the pulse 38 and the effective zero, or ground, potential of the secondary switching bus bars 27, 28 and 29. Photocurrent flows from terminal 24 through resistor 23 and through photosensitive element 11 to charge capacitance 22 and all of the other capacitances, such as capacitance 52, associated with the photosensitive elements of column 17. The capacitances charge in accordance with the light impinging upon photosensitive element 11 until column selecting pulse 48 is applied to terminal 46 and gates on transistors 42, 53, 54 and 55. The capacitors then discharge through the transistors and the video signals appear on conductors 41. Pulse 48 applied to terminal 47 controls the charge-discharge time of photosensitive elements 86–12 and their associated column capacitances.

The image representative signals stored in the respective column capacitances in the manner described are transferred in groups by the signal transfer transistors such as 42, 53, 54 and 55 commonly gated on by the column selecting pulses along conductors 41 to that portion of the decoding apparatus shown in FIG. 2 in the following manner. The impression of the positive-going pulse 48 upon the column switching terminal 46 renders the transistors 42, 53, 54 and 55 conducting, thereby simultaneously transferring the signals produced by the first four photosensitive elements, including element 11, of row 15 and associated with columns 17 through 56, to the conductors 41.

Figure 2:
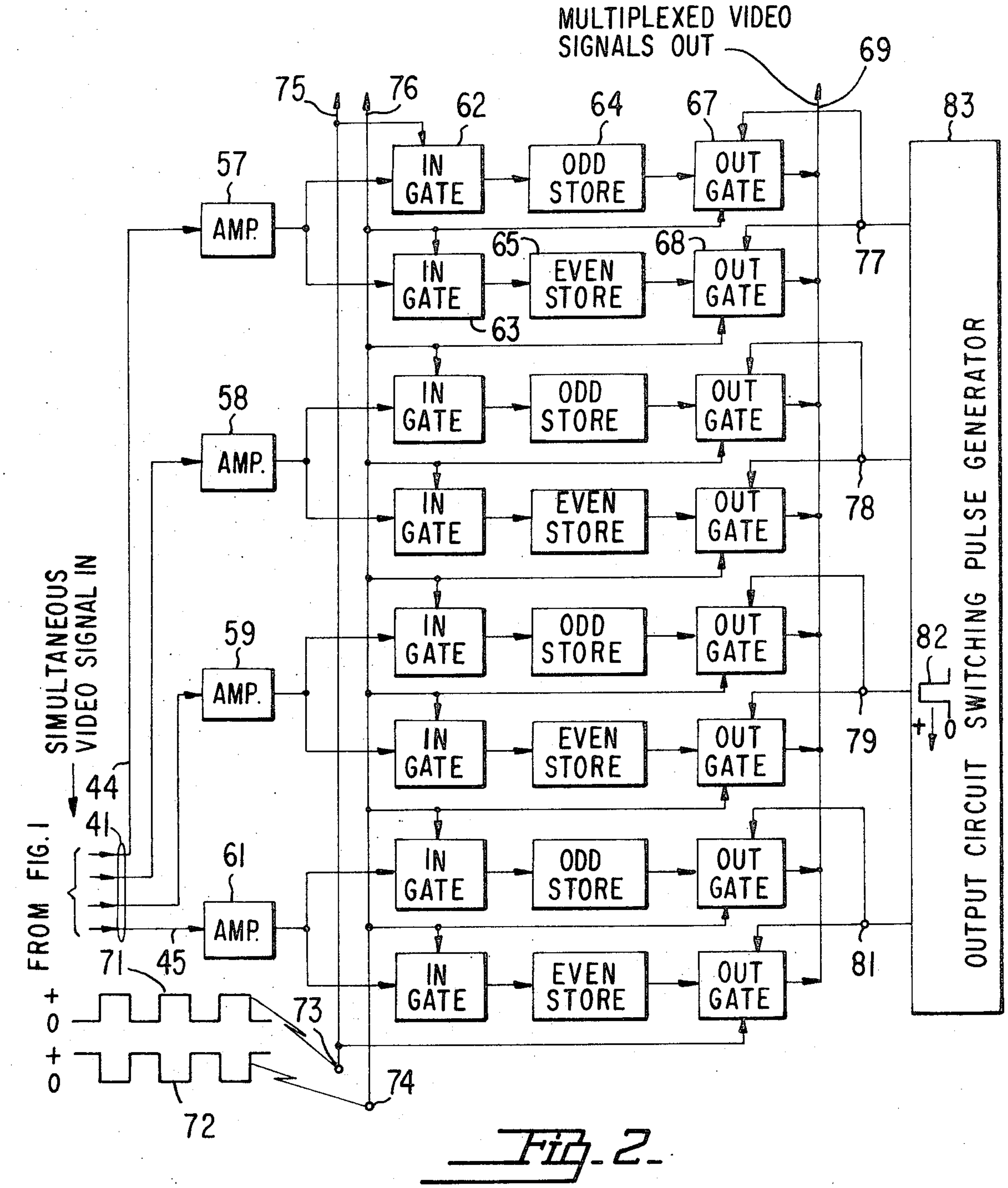
FIG. 2 is a block diagram of another part of the signal transfer system.

These conductors, in FIG. 2, are connected through respective amplifiers 57, 58, 59 and 61 to respective signal storage apparatus. Because all such storage apparatus is the same, only that associated with the signal transfer conductor 44 and the amplifier 57 will be described in detail. The output of the amplifier 57 is coupled to a pair of input gates 62 and 63, the outputs of which are coupled respectively to an odd group storage device 64 and an even group storage device 65. The odd and even group storage devices are coupled respectively to a pair of output gates 67 and 68, the outputs of which are coupled to an output circuit conductor 69.

All of the odd group input gates, such as the gate 62, and all of the even group input gates, such as the gate 63, are alternately rendered conducting by oppositely phased substantially square waves 71 and 72 applied respectively to control terminals 73 and 74 and thence to bus bars 75 and 76 respectively. Also, all of the odd group output gates, such as the gate 67, and all of the even group output gates, such as the gate 68, are alternately prepared for conduction by their respective connections to the bus bars 76 and 75. All of the output gates that are prepared for conduction are rendered sequentially conducting by their connections to one of the output circuit switching terminals 77, 78, 79 and 81 upon which is impressed in sequence a positive-going pulse 82 derived from a clock controlled output circuit switching pulse generator 83. This generator also may be of the type described in U.S. Pat. No. 3,252,009 operating to impress the pulse 82 sequentially upon the terminals 77, 78, 79 and 81 at the elemental signal rate.

The apparatus including the transistors, such as 42 and 43, and the column selecting pulse generator 49 of FIG. 1 comprise the decoding means of the invention. The conductors 41 of FIGS. 1 and 2, the amplifiers 57, 58, 59 and 61, the input gates, such as 62 and 63, and the storage devices, such as 64 and 65, of FIG. 2 comprise the coupling means of the invention by which signals are transferred to the multiplexing means of the invention which includes the output gates, such as 67 and 68, and the elemental rate output circuit switching pulse generator 83.

The coupling apparatus operates as follows. When during a first time interval, the group of signal transfer devices, including the transistor 42, is rendered conducting by the pulse 48 as described, the signals from the odd column group 84, which comprises element columns 17 to 56, are transferred by the conductors 41 to the amplifiers 57, 58, 59 and 61. At this time all of the odd group input gates, such as the gate 62, are rendered conducting by the application thereto of a positive-going half cycle of the square wave 71 impressed upon the control terminal 73. Also, at this time all of the even group input gates, such as the gate 63, are rendered non-conducting by the application thereto of a negative-going half cycle of the square wave 72 impressed upon the control terminal 74. The signals from the odd column group 84 of the panel 10 thus are stored simultaneously in the odd group storage devices, such as the device 64.

During a second and succeeding time interval the group of signal transfer devices, including the transistor 43, is rendered conducting by the impression of the pulse 48 upon the column switching terminal 47. The signals from the even elemental column group 85 comprising columns 86 to 18 are transferred by the conductors 41 to the amplifiers 57, 58, 59 and 61. In this second time interval all of the even group input gates, such as the gate 63, are rendered conducting by the impression thereon of a positive-going half cycle of the wave 72 present at the control terminal 74 and bus bar 76. A negative-going half cycle of the wave 71 present at the control terminal 73 and bus bar 75 renders non-conducting all previously conducting odd group input gates, such as the gate 62. The signals from the even column group 85 of the panel 10 thus are simultaneously stored in the even group storage devices, such as the device 65.

The multiplexing apparatus operates in the following manner. During the described second time interval the positive-going half cycle of the wave 72 present on the bus bar 76 is applied to all of the odd group output gates, such as the gate 67, to prepare them for conduction. These gates, however, are not actually rendered conducting until there is impressed thereon the positive-going pulse 82 derived from the output circuit switching pulse generator 83. The presence of the pulse 82 sequentially at the output circuit switching terminals 77, 78, 79 and 81 renders the conductively prepared odd group output gates, such as the gate 67, successively conducting for elemental signal periods. By such means the first odd group signals that were stored simultaneously during the first time interval in the odd group storage devices, such as the device 64, are transferred sequentially during the second time interval to the output circuit conductor 69.

It will be understood that the first even group signals stored during the second time interval in the even group storage devices, such as the device 65, are transferred sequentially to the output circuit conductor 69 during a third time interval by the sequential conductive operation of the even group output gates, such as the gate 68. Also, during this third time interval signals from a second odd group of panel columns are simultaneously stored in the odd group storage devices, such as the device 64. The described operation of the apparatus comprising this invention continues until the signals produced during one field period by the panel 10 are transferred sequentially to the output circuit, after which the signals produced by the panel during the next field period are similarly processed.

The illustrative panel 10 of FIG. 1, as an example of an array with which the invention may be used, comprises 64 photosensitive elements arranged in eight rows and eight columns. This array is divided, for explanatory purposes, into two groups of four rows and two groups of four columns. It is to be understood, however, that in practice larger panels would be used. One such panel with which the invention has been successfully employed included 65,536 elements arranged in 256 rows and 256 columns. Such a panel was conveniently divided arbitrarily into 16 groups of 16 rows and 16 groups of 16 columns. Within the purview of this invention the panel could, however, have been divided into eight groups of 32 rows and eight groups of 32 columns, for example. In the case of the successfully operated signal transfer system using the 256 × 256 panel the decoding apparatus included 256 signal transfer devices, such as the transistors 42, 43, 53, 54 and 55 divided into 16 groups of 16 devices. The coupling apparatus comprised 16 conductors, such as the conductors 41; 16 amplifiers, such as the amplifiers 57, 58, 59 and 61, to each of which was connected a pair of input gates, such as the gates 62 and 63, and a pair of odd and even group storage devices, such as the devices 64 and 65. The multiplexing apparatus had a pair of output gates, such as the gates 67 and 68, for each transfer conductor and amplifier of the coupling apparatus.

In the operation of the 256 × 256 element panel the output circuit switching control pulse was derived from a 16 stage shift register type of generator 83 at the desired elemental signal rate E. The column selecting pulse generator 49 produced the pulse 48 at the rate of E/16. The row group selecting pulse generator 39 produced the pulse 38 at the rate of E/4096 and the row switching pulse generator produced the pulse 36 at the rate of E/256.

It should be noted that, because of the use of the double storage facility for each signal transfer conductor 41, the signal transferred to the output circuit conductor 69 is delayed by the time required to transfer sequentially the simultaneous signals derived from one column group, such as the group 84 or 85. This may be compensated by advancing, relative to the horizontal blanking interval, the times of impression of the pulse 48 upon the terminals 46 and 47. In this manner, the delay would not be appreciably noticeable in a picture reproduced by the signals. When such a double storage facility is used, the time for deriving each group of signals from a 256 × 256 element panel type sensor, for example, can be up to 16 times longer than the time heretofore available for deriving the signal from a single element.

Among the advantages of such an arrangement is the fact that the signal transfer devices, such as the transistors 42, 43, 53, 54 and 55, may have lower frequency responses than otherwise would be necessary. Also, the frequency response of the amplifiers, such as the amplifiers 57, 58, 59 and 61, can be reduced. Smaller diodes and transistors can be used in the decoding apparatus, thereby reducing the switching capacitances and improving the signal-to-noise ratios. Furthermore, the switching pulses, such as the pulse 48, need not have fast rise times, thus minimizing any switching transients.

Figures 3, 4:
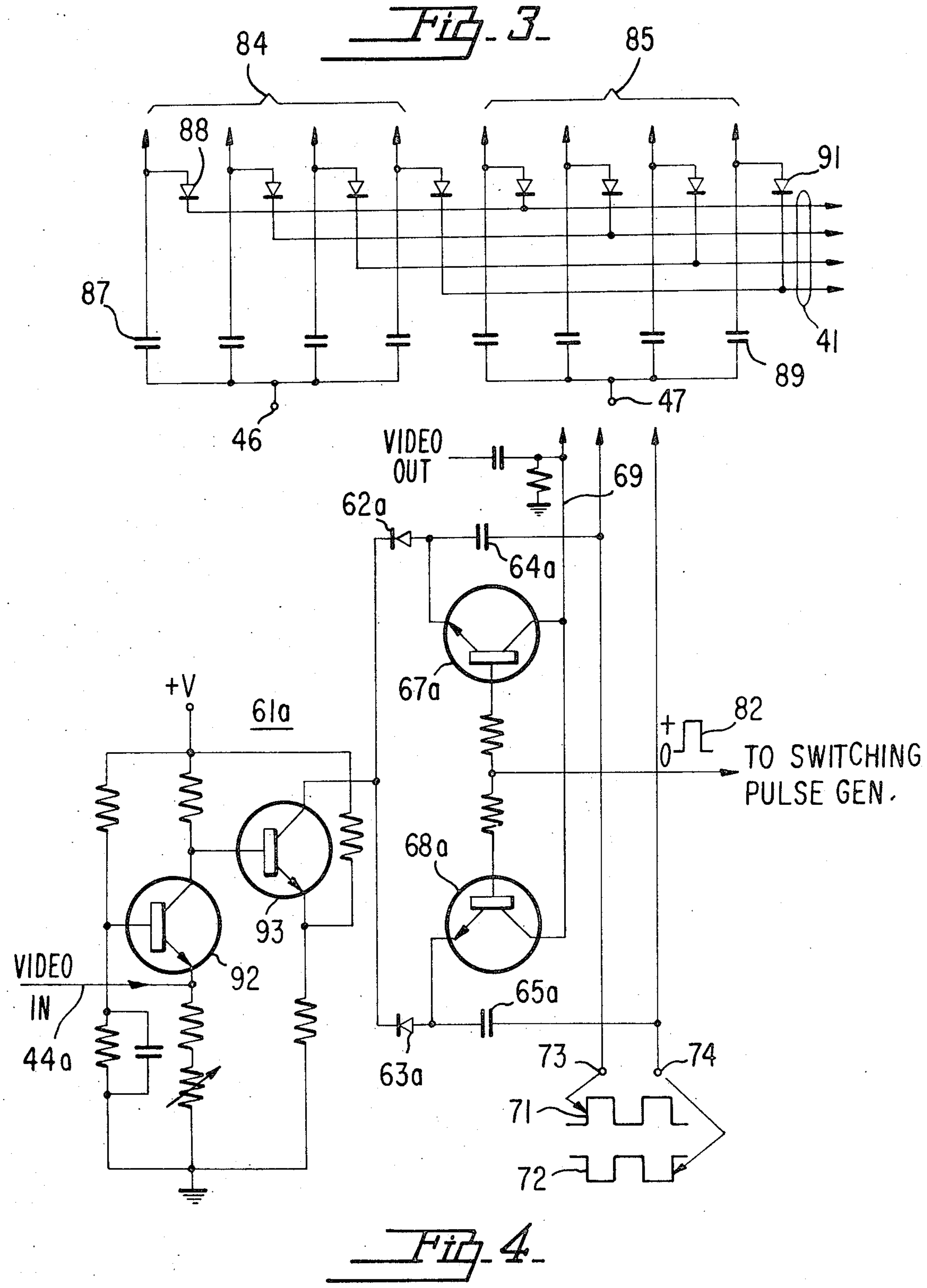
FIG. 3 is a fragmentary circuit diagram of an alternative embodiment of a part of the signal transfer system comprising the invention.
FIG. 4 is a circuit diagram of a particular signal transfer component of the invention.

FIG. 3 illustrates an alternative form of decoding apparatus which may be used in the practice of this invention. Each of the columns in group 84 is connected to a storage capacitor, such as capacitor 87, and to a diode, such as diode 88. Similarly, each of the columns in group 85 is connected to a storage capacitor and a diode, such as capacitor 89 and diode 91, respectively. The storage capacitors 87 and 89 function in substantially the same manner as the photosensitive element inherent capacitances 22 and 52 of FIG. 1. The diodes, such as 88 and 91, comprise the signal transfer devices by which the signals are transferred to the conductors 41 of the coupling apparatus. The diodes, which are normally non-conducting, are rendered conducting during a first time period under the control of the pulse 48 derived from the column selecting pulse generator 49 of FIG. 1. The impression of the positive-going pulse 48 upon the column switching terminal 46, to which the capacitors, such as the capacitor 87, are connected, renders the diodes, such as the diode 88, conducting, thereby simultaneously transferring to the conductors 41 the signal stored in the associated capacitors. The signals derived from the column group 85 are transferred simultaneously to the conductors 41 during the succeeding time period by the impression of the pulse 48 upon the column switching terminal 47.

The circuit diagram of FIG. 4 is that of a presently preferred form of one unit of the apparatus of FIG. 2. The positive-going signal derived from the transfer conductor **44*a* is amplified by an amplifier 61*a*, including NPN transistors 92 and 93, and producing at its output a negative-going signal which is applied to both of the diodes 62*a* and 63*a*. These diodes comprise the input gates 62 and 63 respectively of FIG. 2. The capacitors 64*a* and 65*a* constitute the odd and even group storage devices 64 and 65 respectively of FIG. 2 and the NPN transistors 67*a* and 68*a* serve as the output gates 67 and 68 respectively of FIG. 2**.

In operation, during the first time interval referred to in the foregoing description, a positive-going half cycle of the wave 71 is impressed upon the odd group storage capacitor **64*a* while a negative-going half cycle of the wave 72 is impressed upon the even group storage capacitor 65*a*. Thus, although the negative-going signal derived from the amplifier 61*a* is impressed upon both of the diodes 62*a* and 63*a*, only the diode 62*a* is rendered conducting, thereby charging the odd group storage capacitor 64*a* with the signal. During the second described time interval, a positive-going half cycle of the wave 72 is impressed upon the even group storage capacitor 65*a* and a negative-going half cycle of the wave 71 is impressed upon the odd group storage capacitor 64*a*. The diode 63*a* is rendered conducting and the signal derived at that time from the amplifier 61*a* charges the even group storage capacitor 65*a***.

Also, during the second time period a negative-going half cycle of the wave 71 is impressed upon the odd group storage capacitor **64*a* which is in the emitter electrode circuit of the odd group output gate transistor 67*a*, thereby preparing this transistor for conduction. The application of the positive-going pulse 82, derived from the output circuit switching pulse generator 83 of FIG. 2, to the base electrodes of both of the output gate transistors 67*a* and 68*a* renders only the prepared transistor 67*a* conducting, thereby transferring to the output circuit conductor 69 the signal stored in the odd group capacitor 64*a*. There is no conduction through the even group output gate transistor 68*a* because of the impression of the positive-going half cycle of the wave 72** upon its emitter electrode circuit.

During a third time interval when the odd group input gate diode **62*a* is again rendered conducting, the even group output transistor 68*a* is prepared for conduction by a negative-going half cycle of the wave 72 impressed upon its emitter electrode circuit and is actually rendered conducting by the impression of the pulse 82** upon its base electrode.

All of the components and interconnections therebetween of the apparatus of FIG. 1 may be integrated to produce a solid state image sensor of such small size as to be easily susceptible of hand-held operation. Such a necessarily large scale integration of the great number of components required is accomplished by using known silicon technology or by evaporated film techniques. Because of the simultaneous multiple signal output from the panel 10 the frequency band width requirements of the sensor components are materially less than those imposed upon the components of a panel from which the signals are derived sequentially at a relatively high repetition rate. Hence, the present invention allows the use in the array of integrated thin-film transistors, diodes and other components having frequency characteristics that are inferior to silicon components. It also makes possible the construction of arrays larger than the 256 × 256 panel which may be operated at commercial television scanning rates.

What is claimed is:

1. A signal transfer circuit for conveying two sets of signals from respective sources alternately to a single output circuit comprising:

first and second signal storage devices;

means including first and second normally nonconducting devices coupling said respective storage devices to said signal sources;

operating means for rendering said first and second devices conducting respectively during relatively long first and second time periods to store signals from said two sources respectively in said storage devices;

means including first and second normally nonconducting signal transfer devices operable to couple said first and second storage devices respectively to said output circuit;

conditioning means for preparing said first and second signal transfer devices for conduction respectively during said second and first time periods; and actuating means for rendering said prepared first and second signal transfer devices conducting for fractional portions of said respective second and first time periods.

2. A signal transfer circuit as defined in claim 1, wherein:

first and second capacitors constitute said first and second storage devices respectively;

first and second diodes respectively constitute said first and second devices, said diodes being connected effectively in series between said associated capacitors and said signal sources; and first and second transistors respectively constitute said first and second signal transfer devices, said transistors being connected effectively in series between said associated capacitors and said output circuit.

3. A signal transfer circuit as defined in claim 2, wherein:

said first and second signals are impressed upon both of said diodes in a polarity tending to render said diodes conducting; and said operating means includes apparatus to impress upon said capacitors waves of opposite phase, half cycles of which are of a polarity to render said diodes alternately conducting to charge said capacitors by said signals.

4. A signal transfer circuit as defined in claim 3, wherein:

said waves of opposite phase impressed upon said capacitors are of a polarity tending to render said transistors alternately conducting and constitute said conditioning means for preparing said transistors for alternate conduction; and said actuating means includes apparatus to impress upon the conduction controlling electrodes of said transistors pulses of a polarity to render conducting the transistor prepared for conduction to discharge said capacitors and thereby transfer said signals to said output circuit.

5. A signal processing circuit for converting an input signal comprised regularly spaced pulses of varying amplitude into a smoothly varying output signal, said storage processing circuit including:

an input circuit;

an output circuit;

first and second signal storage devices;

first and second normally nonconducting devices coupling said respective storage devices to said input circuit;

first and second operating means for rendering said first and second devices conducting respectively during relatively long first and second time periods to store said regularly spaced pulses in said storage device;

first and second normally nonconducting signal transfer devices operable to couple said first and second storage devices respectively to said output circuit; and first and second conditioning and actuating means which prepares said first and second signal transfer devices for conduction respectively during said second and first time periods and renders said prepared first and second signal transfer device conducting for fractional portions of said respective second and first time periods.

6. A signal processing circuit as defined in claim 5, wherein:

first and second capacitors constitute said first and second storage devices respectively;

first and second diodes respectively constitute said first and second devices, said diodes being connected effectively in series between said associated capacitors and said input circuit.

7. A signal processing circuit as defined in claim 6, wherein:

each of said first and second operating means includes apparatus to impress upon said capacitors waves of opposite phase, half cycles of which are of a polarity to render said first and second diodes alternately conducting to charge said first and second capacitors by said signals.

8. A signal processing circuit as defined in claim 7, wherein:

half cycles of said waves of opposite phase impressed upon said capacitors are of a polarity tending to render said signal transfer devices alternately conducting and are included in said conditioning and actuating means for preparing said signal transfer devices for alternate conduction; and said first and second conditioning and actuating means includes apparatus to impress upon said signal transfer devices pulses of a polarity to render conducting the signal transfer device prepared for conduction to discharge said capacitors and thereby transfer said signals to said output circuit.

* * * * *